A. K. SLOAN, Jr.
DETECTOR.
APPLICATION FILED DEC. 17, 1910.
1,152,444.
Patented Sept. 7, 1915.
2 SHEETS—SHEET 1.
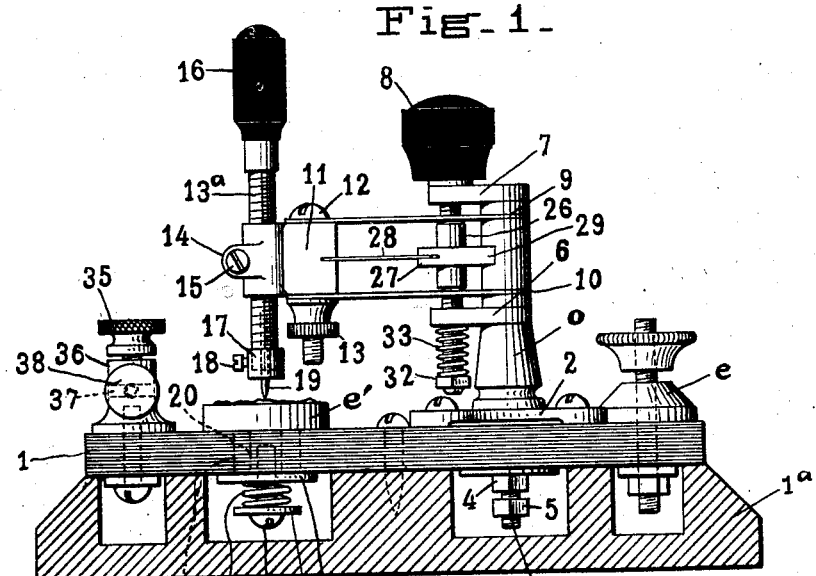
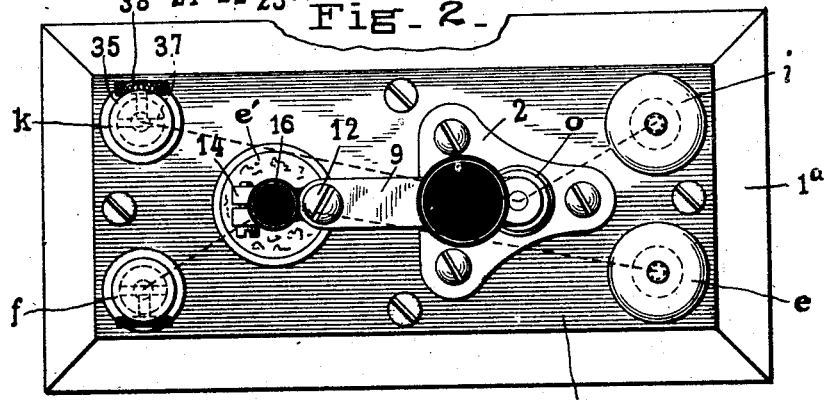
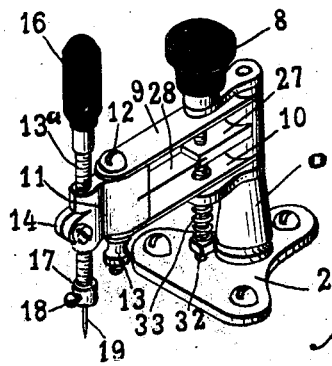
WITNESSES:
INVENTOR
Augustus Kellogg Sloan, Jr.
BY
ATTORNEY A. K. SLOAN, Jr.
DETECTOR.
APPLICATION FILED DEC. 17, 1910.
1,152,444.
Patented Sept. 7, 1915.
2 SHEETS—SHEET 2.
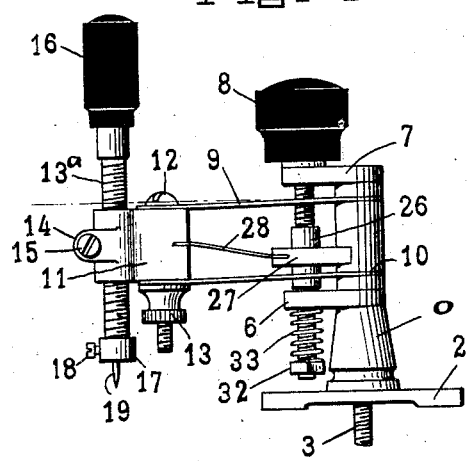
Fig. 4.
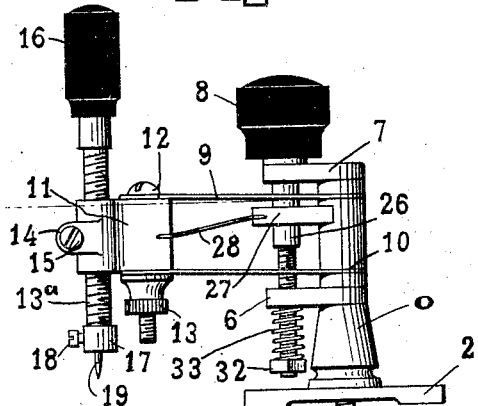
Fig. 5.
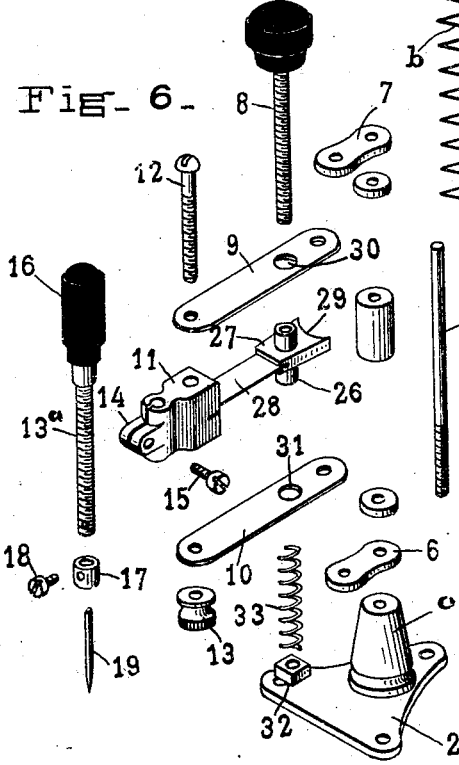
Fig. 6.
Fig. 7.
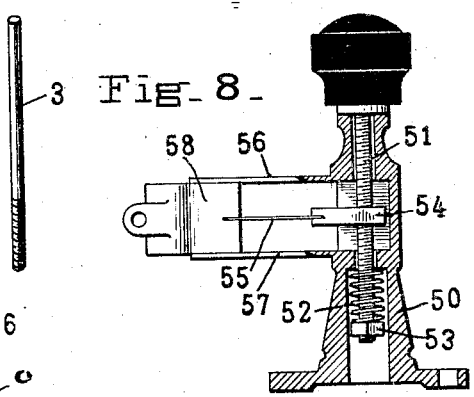
Fig. 8.
WITNESSES:
INVENTOR
Augustus Kellogg Sloan Jr.
BY
ATTORNEY

UNITED STATES PATENT OFFICE.

AUGUSTUS K. SLOAN, JR., OF BROOKLYN, NEW YORK.

DETECTOR.

1,152,444.   Specification of Letters Patent.   Patented Sept. 7, 1915.

Application filed December 17, 1910. Serial No. 597,808.

*To all whom it may concern:*

Be it known that I, AUGUSTUS KELLOGG SLOAN, Jr., a citizen of the United States, and a resident of Brooklyn, in the county of Kings and State of New York, have invented a certain new and useful Detector, of which the following is a full, clear, and exact description, whereby anyone skilled in the art may make and use the same.

The invention relates to devices for detecting signals transmitted from wireless telegraph and wireless telephone stations.

It relates more particularly to what might well be called a micrometer detector, in which the finest and most positive forms of adjustment are made possible.

The objects of the invention are to provide a detector, extremely sensitive as to its adjustment and one which will not be thrown out of adjustment by atmospheric discharges or when charged to high potential.

It is a further object, to provide a device of the character described, which will perform the duty of rectifying electrical energy received from distant stations, in the form of intelligible signals, so that sensitive telephone receivers will transform the electrical impulses to sounds.

A still further object is to provide for a positive position of the adjustable parts, through an almost incredible movement, which will give a most sensitive and desirable contact between the members of the detector, without liability of uncertain adjustment by the operator; and a further object is to provide adjusting means whereby the contacts may be definitely adjustable, within the slightest ranges of movement, for instance, one-hundred-thousandth of an inch or less.

A further object is to provide a detector using materials, in conjunction with mechanical controlling means, which are extremely sensitive, thus increasing the range of distance for the possible exchange of signals, requiring the impression of no auxiliary potential upon the contacts, such as a battery or other device and thus securing a detector, which will not "blow-out" of adjustment, when charged to high potentials, but one which is actually put or held in sensitive adjustment by atmospheric discharges.

Referring to the drawings:—Figure 1 is a view in side elevation of the detector with a supporting base cut in section. Fig. 2 is a plan view of the parts illustrated in Fig. 1. Fig. 3 is a perspective view of the column and supported parts. Fig. 4 is a side view of the column and supported parts, illustrating the contact as depressed, (in exaggeration) by the action of the vernier adjusting screw. Fig. 5 is a similar view illustrating the contact point raised, (in exaggeration) by the micrometer adjusting screw. Fig. 6 is a perspective view of the various parts of the column and supported parts in unassembled position. Fig. 7 is a diagrammatic view illustrating the wiring incidental to the detector. Fig. 8 is a partial sectional view through a supporting column showing a modified form of the device.

It has been common practice, in detectors for wireless purposes, to use various substances, which have the necessary and desired qualities as to rectifying electrical energy received from distant points, in the form of intelligible impulses or signals, so that sensitive telephone receivers will transform the electrical impulses to sounds. These results have been accomplished by passing electrical energy through imperfect contacts between one or more minerals including chalcopyrite, and the mineral red oxid of zinc. Other combinations are bornite and zinkite, possibly more sensitive for increasing the range of distance between given stations. The possible range, of course, is dependent upon the adjustment of the detector, the pressure upon the contacts, and the condition of the surface of the mineral which is used, etc.

It is a fact that the surface of a piece of zinkite, such as used in detectors, within a short time, becomes inefficient for maintaining proper conditions and where zinkite, chalcopyrite, or bornite are used, a discharge of oscillatory nature taking place in the vicinity requires a new adjustment. Therefore, the operator must secure a new adjustment after transmitting, (using an oscillatory discharge) and at the same time is missing the return signals.

As hereinafter defined, a mineral has been found which provides a wonderfully sensitive detector, free from the above-mentioned faults and while it has been heretofore used in some forms, it has not been successfully used, so far as known, owing to the apparent impossibility of holding it in fine electrical adjustment, or automatically through mechanical means, maintaining a proper adjustment.

The mineral referred to is a combination of iron and sulfur and is used as one of the electrodes in conjunction with a metallic point suitably controlled and forming the second electrodes. The efficiency of the detector is dependent upon the point of contact, which must be under light pressure, as nearly mechanically rigid as possible, and at the same time, free from variations and changes due to vibration.

The best results, with the mechanism hereinafter described, are secured with a mineral having, in combination, iron and sulfur and known in general terms as iron pyrites. Various forms of this mineral have been utilized including common pyrites having the proportions of sulfur 53.4 and iron 46.6, pyrrhotite, showing iron as high as 60.4, troilite, showing iron as high as 63.82 and intermediate forms showing various proportions of sulfur and iron.

It appears that the forms of mineral of the general class above defined, containing the highest percentage of iron, give better results than the ordinary pyrites and very much better results than other materials, above referred to. As is hereinafter defined, the greatest benefits secured in the use of these materials is due to their use, in conjunction with adjustments which may be made in substantially positive form and within very slight ranges. These benefits are undoubtedly due to having the contact adjustable both as to position and pressure. In the present forms of devices, so far as known, there are features of adjustment, but the adjustability is accomplished through spring devices and adjusting means of such a non-positive nature that even the influence of the operator's hand in securing a fine adjustment makes the device adjustable almost in a haphazard sense, inasmuch as, when the hand is removed, the adjustment is materially varied and the devices are of such form that the slightest lost motion in the parts destroys the fine adjustment, which is requisite to secure the best and most accurate results.

It is one of the principal objects of the present invention to obviate these difficulties and provide a device in which the contact point may be moved toward and away from the crystal of mineral to a most minute extent, for instance, distances less than one-ten-thousandth of an inch, and at the same time, hold the contacting point in substantially definite position of adjustment. With this field of incredibly fine adjustment as to distances, new points are secured and the tone of the incoming signals may be altered and sharpened to such an extent that it is possible to read the characteristic symbols of the telegraph code, which ordinarily would be too weak for the ear to distinguish.

It is also characteristic of the device hereinafter described that it will hold in adjustment and will not "blow-out" when in the vicinity of an oscillatory discharge or when the high potential of heavy atmospheric discharge is impressed upon it. In fact, such discharges will maintain the detector in good adjustment, and obviously, this is the exact opposite of the action of the ordinary zinkite detectors.

With the device hereinafter described, the movement of the contact is so delicately controlled that it may be adjusted through its entire range, that is, from no signals to the finest adjustment, within a distance of approximately one-ten-thousandth of an inch. Of course, all minute movements, within this range of one-ten-thousandth of an inch, may be obtained. Furthermore, the mechanism is so arranged that variations in its plane of adjustment do not change it electrically.

Referring first to the diagrammatic view, Fig. 7, $a$ indicates the lead to the antenna; $b$, the inductance coil having a lead $c$ connected to ground as at G and connected to the variable condenser $d$, one side of which is connected to the binding post $e$, connected with the receptacle $e'$, and binding post $f$. The latter is in turn connected with the telephone receivers of high resistance $g$. A lead $h$ from the inductance coil $b$ is connected with the binding post $i$, thence to the standard $o$ of the detector and to the adjustable contact-point, through said standard. The binding post $i$ is also connected through a lead-wire $j$ with a binding post $k$, which in turn is connected to the telephone instrument. A variable condenser $l$, is connected across the lines leading from the binding posts $f$, and $k$, to the telephone.

Referring to the remaining figures, the numeral 1 denotes a base preferably of polished hard rubber or other suitable insulating material, which supports the base 2 of the column $o$. The base 2 is preferably of triangular form giving three definite points of support for the column $o$, which, as shown in Fig. 6, is of section form, the several sections being clamped together by a spindle 3, which securely holds the sections in place and at the same time, through binding nuts 4, 5, affords a convenient wire connecting means. Obviously, the column may be made in solid form, if desired, although, as herein illustrated, it comprises several sections between which are secured the supports 6, 7 for the micrometer adjusting screw 8, and its appurtenant parts and provides a proper support for the parallelly arranged springs 9 and 10. These springs 9 and 10 are comparatively heavy and give a substantially firm support to a block 11, which, as shown, is secured to the springs at their outer ends by a screw 12 and nut 13. The screw and nut might, of course, be dispensed with and the spring-members 9 and 10 might be secured in any desired manner to the block 11. As illustrated, the block 11 is screw-threaded to receive an adjustable spindle 13ª, and is provided with a split clamp 14, having a screw 15, by which the spindle 13 may be held in more or less firm adjustment.

The spindle 13ª is surmounted by an insulating handle 16, and at its lower end, is recessed and is provided with a clamping collar 17, and binding screw 18, through which a contact point 19 may be securely held within the end of the spindle 13ª. With this arrangement, the contact point 19 may be renewed at will and may be adjusted in the end of the spindle 13ª.

Underlying the contact-point 19 is a cup $e'$ (Fig. 1), having a screw-threaded shank 20, which passes through an enlarged opening 21 in the base 1, and is resiliently held in place by a spring 22, interposed between washers 23, 24 upon a screw 25. Thus, it is possible to adjust the cup $e'$ either laterally or rotarily with reference to the base 1 and contact-point 19, and owing to the spring-tension thereon, it will remain in any adjusted position. The cup $e'$ is electrically connected, as indicated in diagram in Fig. 7, and is preferably provided with a number of mineral crystals of pyrites form, preferably pyrrhotite, troilite or like substances. The best results are obtained with the forms of pyrites, which are high in iron as compared with sulfur, such as troilite.

The base 1, is for convenience supported upon an insulating base 1ª, suitably recessed to receive the parts projecting below the base 1. It has suitable means for holding the two bases together, such as binding screws.

The threaded spindle 13ª has a comparatively coarse pitch screw-thread, so that a quick adjustment of said spindle may be effected. Intermediate the spring members 9 and 10, and borne upon the spindle 8, which spindle has a fine screw-thread, is a comparatively long nut 26 having a central portion 27 providing a seat for a spring 28, and having an extended portion 29, which rests against the column and insures stability of the parts. The spring 28 is also suitably connected with the central portion of the block 11.

The spindle 8 has bearings in the supporting members 6, 7, and passes through openings 30, 31 in the respective spring-members 9, 10, these openings being sufficiently large to permit the ends of the nut 26 to pass therethrough.

The lower end of the spindle 8, below the support 6, is provided with a nut 32, which holds in place a spring 33, which holds the micrometer spindle 8 in proper position with reference to the support. With this arrangement, it is apparent that a rotation of the spindle 8 will move the nut 26 between the supporting spring-members 9 and 10, and thereby the influence of the spring 28 will become effective with reference to the block 11 and the contact-point 19.

The adjustment is illustrated in exaggerated form in Figs. 4 and 5. In Fig. 4, the nut 26 is shown as depressed throwing the influence of the spring 28 upon the block 11, and supported contact-point 19, tending to press said point downward. In Fig. 5, the opposite condition is illustrated, wherein the nut 26 is shown as raised and the spring 28 is exerting its influence to raise the block 11 and contact-point 19.

It is, of course, understood that the micrometer screw 8, with its nut 26 and spring 28, when adjusted to various positions, influences the position of the spring-members 9, 10. These spring-members, while preferably made of flat, hard spring brass, are sufficiently stiff to support the contact-point and appurtenant parts. The coarse-screw of the spindle 13ª, may, therefore, be adjusted until signals are heard. Thereupon, the micrometer screw 8 may be very slightly turned and it is thereby possible to move the contact-point 19 to the very slightest degree. In fact, it may be moved one-ten-thousandth of an inch or less.

It will be observed that the micrometer screw is located closely adjacent to the supporting column o, and, therefore, the weight of the hand of the operator will not in any way interfere with the adjustment of the contact-point 19.

In Fig. 8, there is shown a slightly modified form, in which the column 50 is shown as having the micrometer screw 51 passing directly through it, with a spring 52 and nut 53 for holding the micrometer screw in place. The traveling nut 54 extends within the column and, of course, is connected with the controlling spring 55 which is positioned intermediate the spring-supporting means 56, 57. These spring-members in turn support the block 58 which acts as a support and provides an adjustment for the spindle.

The main supporting springs 9, 10 are stable enough to maintain the spindle 13ª and its contact-point in definite position, even against shock and jar and actually form a substantially positive support for the contact-point. Obviously, should the spindle 13ª be unduly moved, the pressure of the point upon the crystal of the cup $e'$ might cause deflection of the spring-supporting members. However, such a pressure would be too great to secure proper operation of the device. The spindle 13ª may, however, be adjusted with reference to its support, owing to the coarse-pitch of its screw and thereupon the finest adjustment is attainable by the use of the micrometer screw 8. It is so positioned that only the movement of the nut 26 and its spring-member 28 reacts upon the spring-members 9 and 10 and the contact-point. The binding post members *f* and *k* are particularly well adapted for use in connection with such an instrument as defined. There is a main binding nut 35 which may be used as one terminal connection, which clamps the wire to the main portion of the binding post 36. There is also a transverse opening 37 which forms a second connection and within which the wire may be bound by the nut 38.

Obviously, various changes as to details might be made without departing from the spirit or intent of the invention, which contemplates a means for effectively holding the movable contact-point and adjusting said point to the slightest degree with reference to the coöperating contact member.

What I claim as my invention and desire to secure by Letters Patent is:

1. A detector having a standard or support, a flexible arm extending therefrom, a contact point adjustably supported at the outer end thereof and means including an adjusting screw borne upon the standard for positively varying to minute degrees in both directions of movement the tensioned position of the outer end of said flexible arm and its adjustable contact point.

2. A detector having a standard or support, a plurality of flexible members comprising a resilient supporting arm for the contact member, a contact member adjustable with reference to said arm, an adjusting screw out of engagement with the resilient supporting arm, said screw mounted upon the standard, a flexible member intermediate said adjusting screw and the outer end of the flexible arm positively moved in both directions along said screw for varying to minute degrees the tensioned position of the outer end of the supporting arm and its adjustable contact member.

3. A detector having a standard or support, a flexible arm extending therefrom, an adjustable contact member mounted at one end of said arm, an adjusting device for said arm comprising an adjusting screw mounted upon the standard and a flexible member intermediate said screw and the outer end of the flexible arm, said flexible member being positively adjustable in both directions along said screw whereby a fixed tension is exerted upon the outer end of the flexible arm when positioned in either direction.

4. A detector having a standard or support, a pair of substantially parallel flexible members extending therefrom and forming a supporting arm, a screw-threaded spindle, operatively mounted at the outer end of said arm and bearing a contact-point, an adjustable spring member interengaging said supporting arm at its outer end and an adjusting device having a bearing entirely upon the support and adapted to positively influence the position of the spring-member to exert a positive adjusting influence upon the supporting arm in both directions of adjustment at any adjusted position of the supporting arm.

5. A detector having a standard or support, a flexible arm extending therefrom, a contact adjustably mounted at the outer end of said arm, means for raising and lowering the outer end of said arm to minute degrees, said means comprising a spring member in engagement with the outer end of the spring arm and having its opposite end positively adjustable in an axial direction along an adjusting screw borne upon the standard whereby the tension of said spring member is increased or decreased with reference to the outer end of the spring arm at any adjusted position thereof, and a contact member coöperating with the adjustable contact.

6. A detector having a standard or support, a flexible arm consisting of parallel spring members secured to said support and bearing at their outer ends a screw-threaded spindle, a contact point secured in said spindle, an adjusting screw operatively mounted upon the standard and out of contact with the spring arm, a nut traversing said adjusting screw and a spring member secured to said nut and connected with the outer end of the flexible arm for exerting a tension for flexing and positioning under tension the spring arm to minute degrees in either direction to vary the position of adjustment of the spindle and its resilient reaction upon the contact point.

7. A detector having a standard or support, an adjusting screw mounted thereon and out of direct contact with the resilient arm, a nut traversing said screw, a resilient arm extending from the standard and a resilient member secured to the nut and the forward end of the resilient arm for varying the tensioned position of the outer end of said spring arm to a minute degree in either direction as the nut traverses the adjusting screw.

8. A detector having a standard or support, a resilient arm extending therefrom, a coarse-pitch adjusting screw adjustably mounted at the free end of said arm, and an adjusting device comprising an adjusting screw and non-rotary nut, said screw and nut borne upon the standard and operatively connected with the adjusting screw for positively varying the position of adjustment of said adjusting screw to minute degrees in both directions.

9. In a device of the character described, a contact member comprising a cup containing as a chemical compound crystallized iron pyrite in its highest form of pyrrhotite and troilite.

10. In a device of the character described having a base or support of insulating material bearing a standard, a resilient arm extending from the standard, a screw-threaded spindle operatively mounted upon the standard and extending through said resilient arm though out of engagement therewith, a non-rotative nut traversing said spindle, a resilient arm extending from and connected with said nut and connected with the outer end of the resilient arm for raising and lowering said arm to minute degrees and a contact point operatively arranged with reference to said resilient arm.

11. In a device of the character described, a base or support of insulating material bearing a standard, a spring arm projecting therefrom, bearing arms, a screw-threaded spindle mounted thereon, a nut mounted upon the screw-threaded spindle and having a projection bearing against the standard and a spring blade intermediate said nut and the outer ends of the spring arm whereby the raising and lowering of the nut will influence the position of the spring arms to a minute degree.

12. In a device of the character described having a base or support of insulating material bearing a standard, a screw-threaded spindle operatively mounted with reference to said standard, a spring for maintaining said spindle in its bearings, a nut traversing said spindle, a resilient arm extending from the standard and bearing a comparatively coarse-pitch adjusting screw, a contact-point operatively arranged with reference to said screw, and a connection intermediate the nut and said screw whereby minute degrees of adjustment may be given to the contact-point.

13. In a device of the character described having a base or support of insulating material bearing a standard, a screw-threaded spindle operatively mounted with reference to said standard, a spring for maintaining said spindle in its bearings, a nut traversing said spindle, a resilient arm extending from the standard and bearing a comparatively coarse-pitch adjusting screw, a contact-point operatively arranged with reference to said screw, a connection intermediate the nut and said screw, whereby minute degrees of adjustment may be given to the contact-point, and a contact-member resiliently held to the insulating base and adjustable with reference to the coöperating contact-point.

14. In a device of the character described having a standard or support, a flexible arm extending therefrom, a contact-member adjustably mounted at the outer end of said arm, an adjusting spindle concentrically arranged with reference to the support, a movable adjusting device operatively arranged on said spindle, and connected with the contact member.

15. In a device of the character described, a cup contact having a shank extending into a base piece, and resilient means interposed between the shank and base for holding said cup firmly against the base whereby it may be laterally and rotarily adjusted.

16. In a device of the character described, a contact cup overlying an opening of the base, and resilient means operatively arranged between the contact cup and base for holding said contact cup firmly against the base whereby the cup may be moved laterally and rotarily with reference thereto.

17. In a device of the character described, a base, a supporting standard operatively mounted thereon and bearing an adjustable contact member, an opening through said base underlying said contact member, a cup contact adapted for lateral and rotary adjustment with reference to the contact member and base opening and resilient means operatively arranged between the cup and base for holding said cup contact in any position of adjustment.

A. K. SLOAN, Jr.

Witnesses:
 MAX BERG,
 KATE BRENNER.